(12) United States Patent
Biagioli et al.

(10) Patent No.: US 11,774,093 B2
(45) Date of Patent: Oct. 3, 2023

(54) BURNER COOLING STRUCTURES

(71) Applicant: General Electric Company, Schenectady, NY (US)

(72) Inventors: Nico Biagioli, Baden (CH); Christian Steffen Terhaar, Wettingen (CH); Holger Luebcke, Lorrach (DE); Andre Theuer, Baden (CH)

(73) Assignee: General Electric Company, Schenectady, NY (US)

( * ) Notice: Subject to any disclaimer, the term of this patent is extended or adjusted under 35 U.S.C. 154(b) by 239 days.

(21) Appl. No.: 16/842,915

(22) Filed: Apr. 8, 2020

(65) Prior Publication Data
US 2021/0317986 A1 Oct. 14, 2021

(51) Int. Cl.
*F23D 14/78* (2006.01)
*F23D 11/38* (2006.01)
*F23R 3/28* (2006.01)

(52) U.S. Cl.
CPC .............. *F23D 14/78* (2013.01); *F23D 11/38* (2013.01); *F23R 3/283* (2013.01); *F23D 2214/00* (2013.01); *F23D 2900/00014* (2013.01)

(58) Field of Classification Search
CPC ....................... F23R 3/283; F23R 2900/03343; F23R 3/343; F23D 14/78; F23D 2900/00014
See application file for complete search history.

(56) References Cited

U.S. PATENT DOCUMENTS

| | | | |
|---|---|---|---|
| 6,155,820 A | 12/2000 | Dobbeling et al. | |
| 6,539,724 B2 | 4/2003 | Cornwell et al. | |
| 7,003,960 B2 | 2/2006 | Eroglu | |
| 7,241,138 B2 | 7/2007 | Flohr et al. | |
| 7,428,817 B2 | 9/2008 | Brunner et al. | |
| 7,434,404 B2 | 10/2008 | Cerny et al. | |
| 7,445,445 B2 | 11/2008 | Eroglu et al. | |
| 7,520,745 B2 | 4/2009 | Oomens et al. | |
| 7,568,907 B2 | 8/2009 | Carroni et al. | |
| 8,069,671 B2 | 12/2011 | Hellat et al. | |

(Continued)

FOREIGN PATENT DOCUMENTS

| | | |
|---|---|---|
| EP | 1942303 A1 | 7/2008 |
| EP | 2567785 A1 | 3/2013 |

(Continued)

OTHER PUBLICATIONS

English translation of WO 2014/177371 A1, provided by European Patent Office (Year: 2014).*

*Primary Examiner* — Thomas P Burke
(74) *Attorney, Agent, or Firm* — Dority & Manning, P.A.

(57) ABSTRACT

A burner includes a main body having an outer surface and at least partially defining an interior. The main body further includes an upstream end axially spaced from a downstream end. The outer surface includes a burner front face at the downstream end of the main body. An annular cooling air plenum is defined in the main body radially inwardly from the outer surface. A cooling air passage extends from the outer surface to the annular cooling air plenum. A plurality of cooling channels is circumferentially spaced apart from one another along the burner front face. Each cooling channel of the plurality of cooling channels extends from a respective inlet in fluid communication with the annular cooling air plenum to a respective outlet.

20 Claims, 6 Drawing Sheets

(56) References Cited

U.S. PATENT DOCUMENTS

| | | |
|---|---|---|
| 8,313,324 B2 | 11/2012 | Bulat et al. |
| 8,801,429 B2 | 8/2014 | Eroglu et al. |
| 8,881,531 B2 | 11/2014 | Scarinci et al. |
| 8,973,367 B2 | 3/2015 | Bottcher et al. |
| 9,212,819 B2 | 12/2015 | Sanderson |
| 9,358,729 B2 | 6/2016 | Hofacker et al. |
| 9,441,837 B2 | 9/2016 | Pasqualotto et al. |
| 9,464,810 B2 | 10/2016 | Genin et al. |
| 9,933,163 B2 | 4/2018 | Pasqualotto et al. |
| 2009/0139242 A1 | 6/2009 | Senior et al. |
| 2010/0139286 A1 | 6/2010 | Gerward et al. |
| 2012/0047907 A1 | 3/2012 | Zajadatz et al. |
| 2014/0202163 A1* | 7/2014 | Johnson ............... B22F 10/20 264/109 |
| 2015/0007571 A1 | 1/2015 | Pasqualotto et al. |
| 2015/0266092 A1 | 9/2015 | Andersson et al. |
| 2016/0067923 A1 | 3/2016 | James et al. |
| 2016/0123595 A1 | 5/2016 | Eroglu et al. |
| 2016/0250715 A1 | 9/2016 | Burbaum et al. |
| 2016/0252251 A1 | 9/2016 | Biagioli et al. |
| 2017/0211807 A1 | 7/2017 | Graichen |
| 2018/0058697 A1* | 3/2018 | Öfverstedt ............... F23R 3/20 |
| 2018/0214954 A1 | 8/2018 | Haevaker et al. |
| 2018/0216828 A1 | 8/2018 | Johansson et al. |
| 2018/0231255 A1 | 8/2018 | Gaupp et al. |
| 2018/0245471 A1 | 8/2018 | Eriksson et al. |
| 2019/0011132 A1 | 1/2019 | Camponovo et al. |
| 2019/0249876 A1* | 8/2019 | Freeman ............... B33Y 80/00 |
| 2019/0264913 A1 | 8/2019 | Johansson et al. |
| 2019/0346140 A1 | 11/2019 | Kiener et al. |
| 2019/0360696 A1* | 11/2019 | Kiener ............... F02C 7/14 |
| 2020/0018483 A1* | 1/2020 | Hockley ............... F23R 3/283 |

FOREIGN PATENT DOCUMENTS

| | | | | |
|---|---|---|---|---|
| EP | 2685162 A1 | 1/2014 | | |
| EP | 2853818 A1 | 4/2015 | | |
| EP | 2905539 A1 | 8/2015 | | |
| EP | 3059501 A1 | 8/2016 | | |
| EP | 3237804 A1 | 11/2017 | | |
| EP | 2722592 B1 | 4/2018 | | |
| EP | 3301367 A1 * | 4/2018 | ............... | F02C 7/12 |
| EP | 3425281 A1 | 1/2019 | | |
| WO | WO-2014177371 A1 * | 11/2014 | ............... | F23D 11/38 |
| WO | WO2018/041647 A1 | 3/2018 | | |
| WO | WO2018/114918 A1 | 6/2018 | | |
| WO | WO2018/127471 A1 | 7/2018 | | |
| WO | WO2018/134058 A1 | 7/2018 | | |

\* cited by examiner

BURNER COOLING STRUCTURES

FIELD

The present disclosure relates generally to burners used in turbomachine combustors and, more particularly, to the burner cooling structures.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within one or more combustors and burn in respective combustion chamber(s) to generate high pressure and high temperature combustion gases. The combustion gases flow from the one or more combustors into the turbine section where they expand to produce work. For example, expansion of the combustion gases in the turbine section may rotate a rotor shaft connected, e.g., to a generator to produce electricity. The combustion gases then exit the gas turbine via the exhaust section.

Modern combustors are operated at high temperatures, which generate high thermal stresses on various mechanical components disposed within the combustor. For example, particular combustors include one or more fuel nozzles or burners positioned within the upstream end of the combustor. The burners extend from an end cover and are typically disposed substantially adjacent to the combustion chamber. The burners are generally exposed to extremely high temperatures within the combustor.

As a result, at least a portion of the compressed air supplied to the combustor is used to cool these components. Accordingly, the burners require various passages, cavities, and apertures through which cooling air from the compressor section may flow. However, utilizing a large portion of cooling air from the compressor section to cool the burners may negatively impact the overall efficiency of the turbomachine.

Known burners require multiple cooling air circuits to cool various features of the burners, which results in a large utilization of cooling flow air and therefore a decreased overall turbomachine efficiency. Accordingly, an improved burner cooling circuit design is desired in the art. In particular, a burner cooling circuit design that provides burner cooling without requiring multiple air circuits and that reduces the amount of cooling air utilized is desired in the art.

BRIEF DESCRIPTION

Aspects and advantages of the burners and turbomachines in accordance with the present disclosure will be set forth in part in the following description, or may be obvious from the description, or may be learned through practice of the technology.

In accordance with one embodiment, a burner is provided. The burner includes a main body. The main body includes an outer surface and defines an interior. The main body has an upstream end axially spaced from a downstream end with respect to an axial centerline of the burner. The outer surface includes a burner front face at the downstream end of the main body. The burner further includes an annular air plenum defined in the main body, which is radially inward from the outer surface. The burner also includes a cooling air passage that extends from the outer surface to the annular air plenum. The burner further includes a plurality of cooling channels circumferentially spaced apart from one another along the burner front face. Each cooling channel of the plurality of cooling channels extends from a respective inlet in fluid communication with the annular air plenum to a respective outlet defined in the outer surface upstream from the burner front face.

In accordance with another embodiment, a turbomachine is provided. The turbomachine includes a compressor section, a turbine section, and a combustor section comprising a plurality of burners. Each burner includes a main body. The main body includes an outer surface and defines an interior. The main body has an upstream end axially spaced from a downstream end with respect to an axial centerline of the burner. The outer surface includes a burner front face at the downstream end of the main body. The burner further includes an annular air plenum defined in the main body, which is radially inward from the outer surface. The burner also includes a cooling air passage that extends from the outer surface to the annular air plenum. The burner further includes a plurality of cooling channels circumferentially spaced apart from one another along the burner front face. Each cooling channel of the plurality of cooling channels extends from a respective inlet in fluid communication with the annular air plenum to a respective outlet defined in the outer surface upstream from the burner front face.

These and other features, aspects and advantages of the present burners and turbomachines will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION

A full and enabling disclosure of the present burners and turbomachines, including the best mode of making and using the present systems and methods, directed to one of ordinary skill in the art, is set forth in the specification, which makes reference to the appended figures, in which.

DETAILED DESCRIPTION

Figure 1:
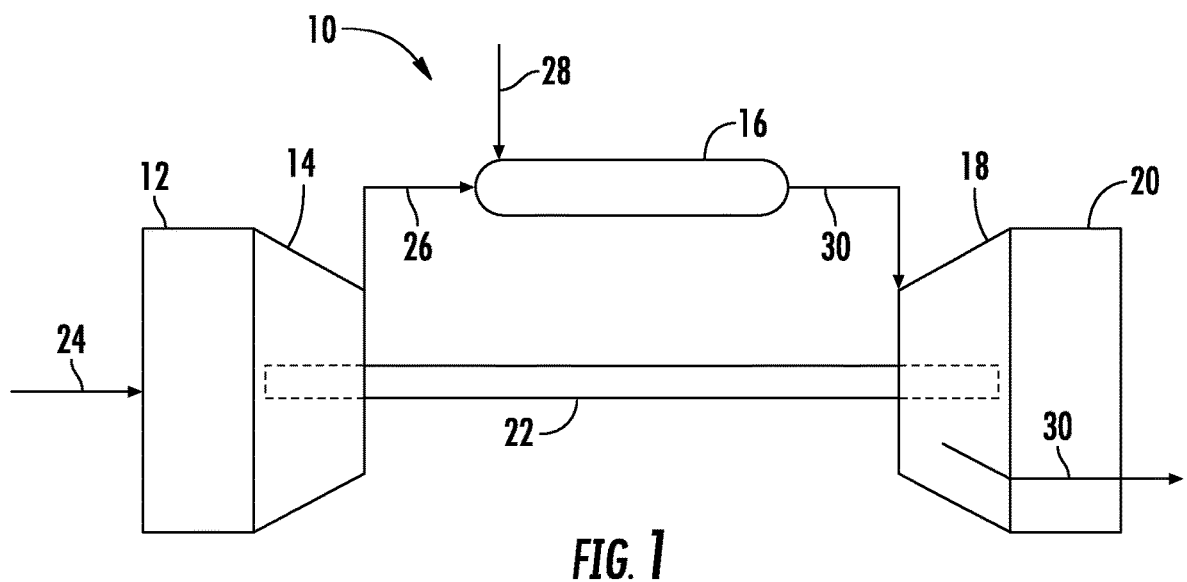
FIG. 1 illustrates a schematic diagram of a turbomachine, in accordance with embodiments of the present disclosure.

Reference now will be made in detail to embodiments of the present burners and turbomachines, one or more examples of which are illustrated in the drawings. Each example is provided by way of explanation, rather than limitation of, the technology. In fact, it will be apparent to those skilled in the art that various modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component; the term "axially" refers to the relative direction that is substantially parallel and/or coaxially aligned to an axial centerline of a particular component; and the term "circumferentially" refers to the relative direction that extends around the axial centerline of a particular component.

Terms of approximation, such as "generally" or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Referring now to the drawings, FIG. 1 illustrates a schematic diagram of one embodiment of a gas turbine 10. Although an industrial or land-based gas turbine is shown and described herein, the present disclosure is not limited to a land-based and/or industrial gas turbine unless otherwise specified in the claims. For example, the burner as described herein may be used in any type of turbomachine including, but not limited to, a steam turbine, an aircraft gas turbine, or a marine gas turbine.

Figure 2:
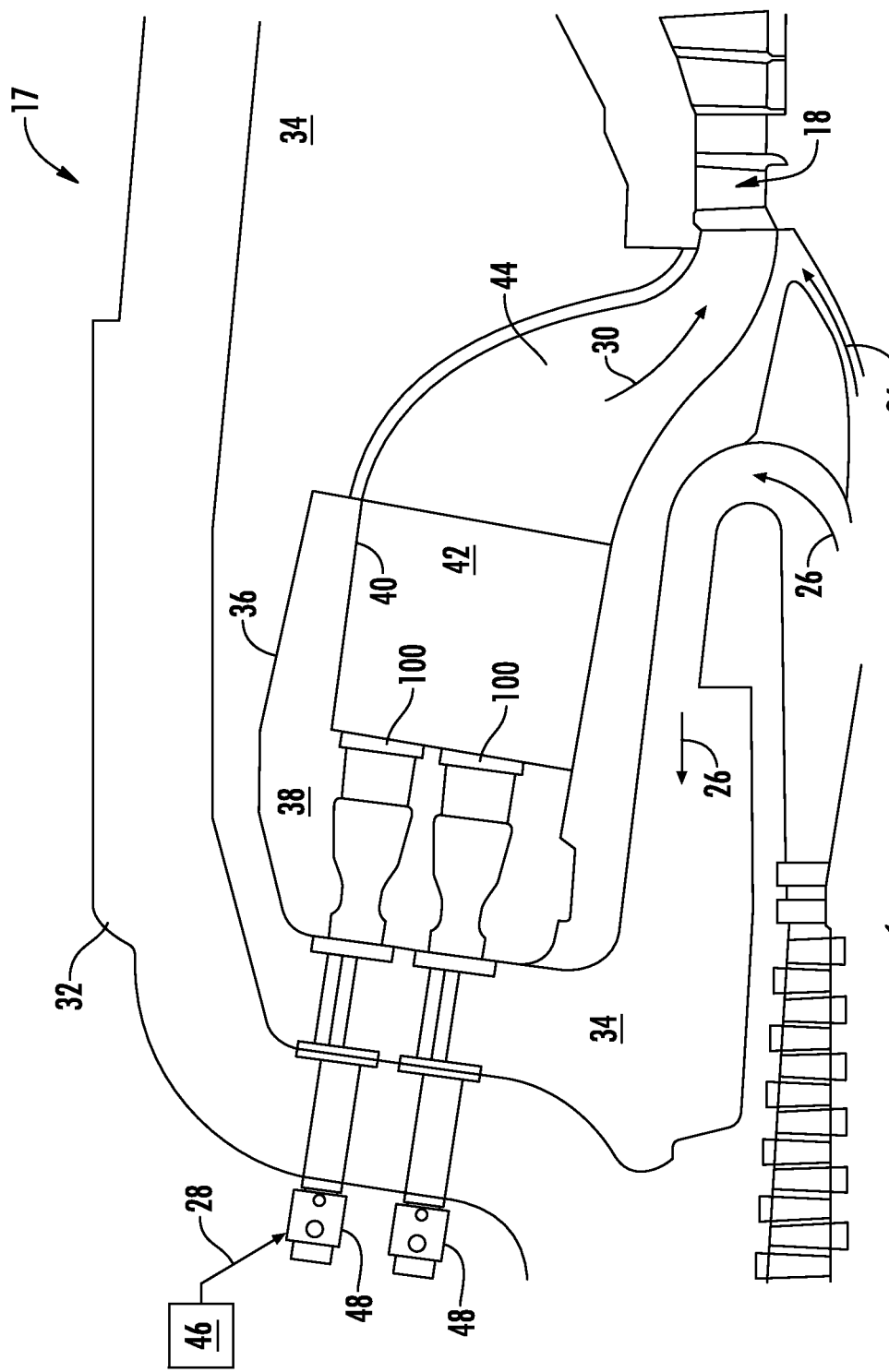
FIG. 2 illustrates a simplified cross-section of a combustor, in accordance with embodiments of the present disclosure.

As shown, the gas turbine 10 generally includes an inlet section 12, a compressor section 14 disposed downstream of the inlet section 12, an annular combustor 17 (a portion of which is shown in FIG. 2) within a combustor section 16 disposed downstream of the compressor section 14, a turbine section 18 disposed downstream of the combustor section 16, and an exhaust section 20 disposed downstream of the turbine section 18. Additionally, the gas turbine 10 may include one or more shafts 22 that couple the compressor section 14 to the turbine section 18.

During operation, air 24 flows through the inlet section 12 and into the compressor section 14 where the air 24 is progressively compressed, thus providing compressed air 26 to the combustor section 16. At least a portion of the compressed air 26 is mixed with a fuel 28 within the combustor section 16 and burned to produce combustion gases 30. The combustion gases 30 flow from the combustor section 16 into the turbine section 18, wherein energy (kinetic and/or thermal) is transferred from the combustion gases 30 to rotor blades (not shown), thus causing shaft 22 to rotate. The mechanical rotational energy may then be used for various purposes such as to power the compressor section 14 and/or to generate electricity. The combustion gases 30 exiting the turbine section 18 may then be exhausted from the gas turbine 10 via the exhaust section 20.

As shown in FIG. 2, the combustor 17 may be at least partially surrounded by an outer casing 32, such as a compressor discharge casing. The outer casing 32 may at least partially define a high pressure plenum 34 that at least partially surrounds various components of the combustor 17. The high pressure plenum 34 may be in fluid communication with the compressor section 14 to receive the compressed air 26 therefrom. The combustor 17 may be in fluid communication with the compressor section 14 such that compressed air 26 flows from the compressor section 14 to the combustor 17, e.g., via the high pressure plenum 34. A combustor hood 36 may be positioned within the outer casing 32. In particular embodiments, the combustor hood 36 may at least partially define a head end volume or portion 38 of the combustor 17.

In particular embodiments, the head end portion 38 is in fluid communication with the high pressure plenum 34 and/or the compressor section 14. One or more liners or ducts 40 may at least partially define a combustion zone or combustion chamber 42 for combusting the fuel-air mixture and/or may at least partially define a hot gas path 44 through the combustor 17, for directing the combustion gases 30 towards an inlet to the turbine section 18.

In various embodiments, the combustor 17 includes at least one burner fuel gas inlet 48. As shown in FIG. 2, the burner fuel gas inlet 48 may be coupled to the outer casing 32 and extend towards the combustion chamber 42. The one or more burner fuel gas inlets 48 may be in communication with a fuel supply 46. Each burner fuel gas inlet 48 may supply fuel 28 to one or more burners 100.

Figure 3:
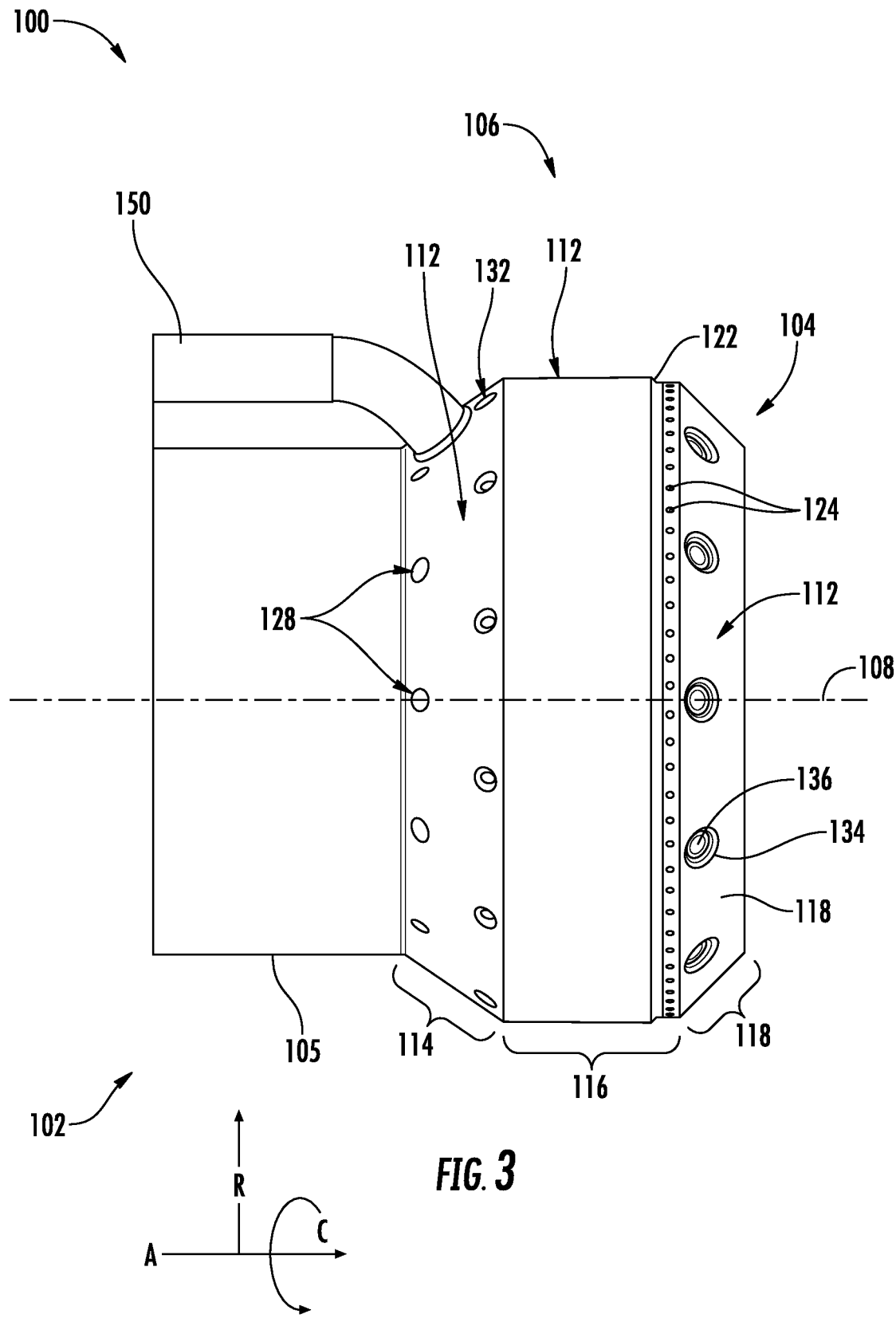
FIG. 3 illustrates a side view of a burner, in accordance with other embodiments of the present disclosure.

FIG. 3 illustrates a side view of a burner 100, in accordance with one or more embodiments of the present disclosure. As shown in FIG. 3, the burner 100 may define an axial direction A, a radial direction R, and a circumferential direction C. In general, the axial direction A extends parallel to an axial centerline 108 of the burner 100, the radial direction R extends generally orthogonal to the axial centerline 108, and the circumferential direction C extends generally concentrically around the axial centerline 108.

Further, as shown, the burner 100 may include a downstream end 104, an upstream portion 105, and a main body 106. The upstream portion 105 may include an upstream end 102. The main body 106 may be downstream from the upstream portion 105 along the axial centerline 108. Likewise, the upstream end 102 may be axially spaced from the downstream end 104 with respect to the axial centerline 108. The upstream end 102 of the burner 100 may be welded, brazed, or otherwise coupled to the combustor 17. The upstream portion 105 may extend between, and axially separate, the upstream end 102 and the main body 106. In various embodiments, the upstream portion 105 may be shaped as a substantially hollow cylinder having a constant inner and outer diameter.

In many embodiments, such as the one shown in FIG. 3, the main body 106 may define an outer surface 112 which includes, in sequence, a forward portion 114, a middle portion 116, and a burner front face 118. In various embodiments, the outer surface 112 may be the radially outermost surface of the main body 106 and may extend from the forward portion 114 to the burner front face 118. The forward portion 114 may extend radially outwardly along the axial centerline 108 from the upstream portion 105 to the middle portion 116.

The forward portion 114 of the outer surface 112 may define a plurality of pilot air inlets 128 circumferentially spaced apart around the forward portion 114. Each of the pilot air inlets 128 may be axially aligned with one another, i.e., there is no axial offset or spacing between each pilot air inlet 128.

In many embodiments, the forward portion 114 of the outer surface 112 may further define a plurality of cooling air inlets 132. In many embodiments, the plurality of cooling air inlets 132 may be defined axially downstream from the plurality of pilot air inlets 128. In some embodiments, the plurality of cooling air inlets 132 may be positioned radially outwardly and axially downstream from the plurality of pilot air inlets 128. Each of the plurality of cooling air inlets 132 may be circumferentially spaced apart from one another. Additionally, each of the plurality of cooling air inlets 132 may be circumferentially positioned between two or more of the plurality of pilot air inlets 128. That is, the locations of the pilot air inlets 128 and the cooling air inlets 132 may be staggered relative to one another. As shown in FIG. 3, a fuel inlet 150 may be fluidly coupled to the outer surface 112 of the burner 100 at the forward portion 114.

The middle portion 116 may extend axially from the forward portion 114 to the burner front face 118. In many embodiments, the middle portion 116 may be generally concentric with the axial centerline 108 of the burner 100. In various embodiments, the middle portion 116 of the main body 106 may include a lip 122 and a plurality of cooling channel outlets 124. The lip 122 may be defined or positioned at a downstream end of the middle portion 116, which is axially upstream from the plurality of cooling channel outlets 124. In some embodiments, the lip 122 may be a radial cut or recess within the outer surface 112. The lip 122 may be a continuous recess within the outer surface 112 of main body 106 in the circumferential direction.

Figure 6:
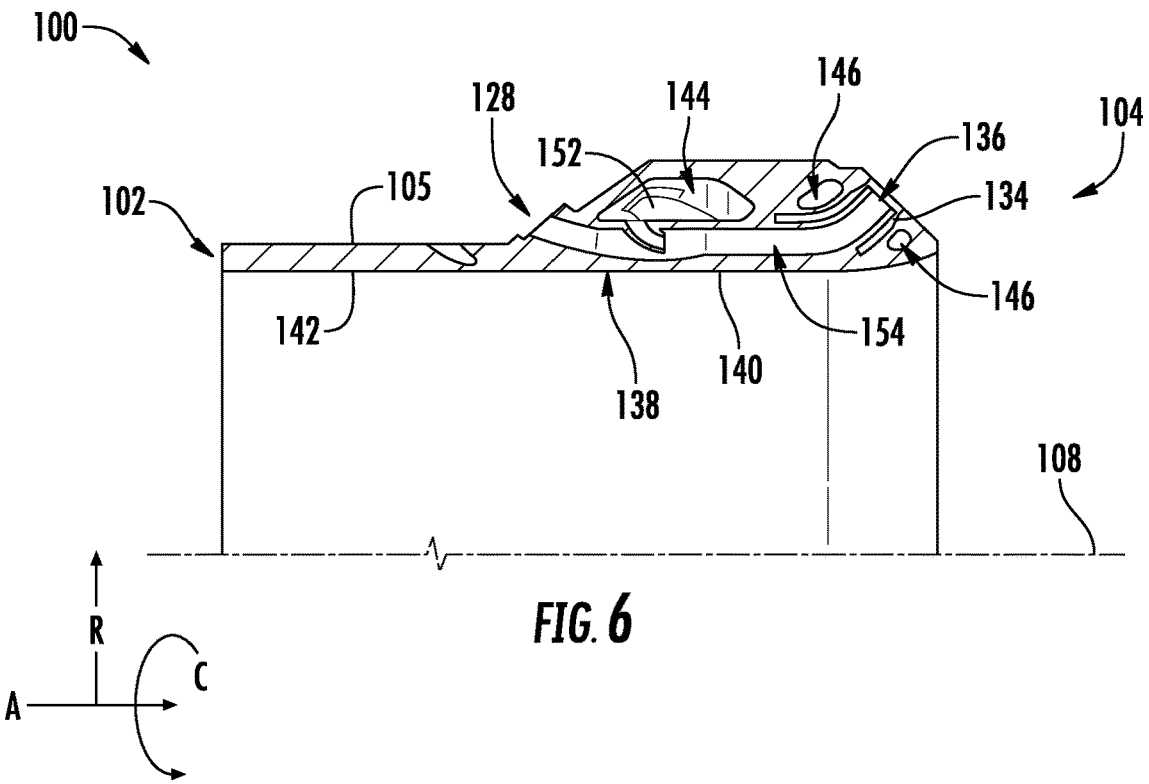
FIG. 6 illustrates a cross-section side view of a burner, in accordance with embodiments of the present disclosure.

As shown in FIG. 3, the lip 122 may extend radially beyond the plurality of cooling channel outlets 124. The plurality of cooling channel outlets 124 may be circumferentially spaced apart from one another and defined within the middle portion 116 of the outer surface 112 axially downstream from the lip 122. In many embodiments, the cooling channel outlets 124 may function to direct a portion of cooling flow air axially upstream towards the lip 122, i.e., the cooling channel outlets 124 may direct at least a portion of cooling air opposite the direction of the fuel/air mixture exiting the burner 100. In other embodiments, the cooling channel outlets 124 may direct at least a portion of the cooling flow air generally radially to prevent the fuel/air mixture exiting the pilot nozzle 154 (as shown in FIG. 6) from recirculating into the burner 100. The burner front face 118 may extend from the middle portion 116 to the downstream end 104.

In many embodiments, such as the one shown in FIG. 3, the burner front face may converge radially inwardly along the axial centerline 108 from the middle portion 116 to the downstream end 104. In other embodiments (not shown), the burner front face 118 may be a substantially flat surface that is generally perpendicular to the axial direction A, i.e., oriented along the radial direction R. In yet still other embodiments (not shown), the burner front face 118 may diverge radially outwardly along the axial centerline 108 from the middle portion 116 to the downstream end 104. Further, in some embodiments (not shown), the burner front face 118 may be substantially arcuate. For example, in such embodiments, the burner front face 118 may be a curvilinear surface that may be either concave or convex with respect to the radial direction R. As shown in FIG. 3, the burner 100 and the burner front face 118 may both terminate at the downstream end 104.

As shown in FIG. 3, the main body 106 may further define a plurality of pilot nozzle outlets 136. Each pilot nozzle outlet 136 may be recessed from the burner front face 118. In many embodiments, the pilot nozzle outlets 136 may be sunken along the burner front face 118, i.e., the pilot nozzle outlets 136 may not align with the burner front face 118 along the axial or radial directions. As shown, the burner front face 118 may at least partially define a plurality of outer sleeves 134, each of which surrounds a respective pilot nozzle outlet 136.

Figure 4:
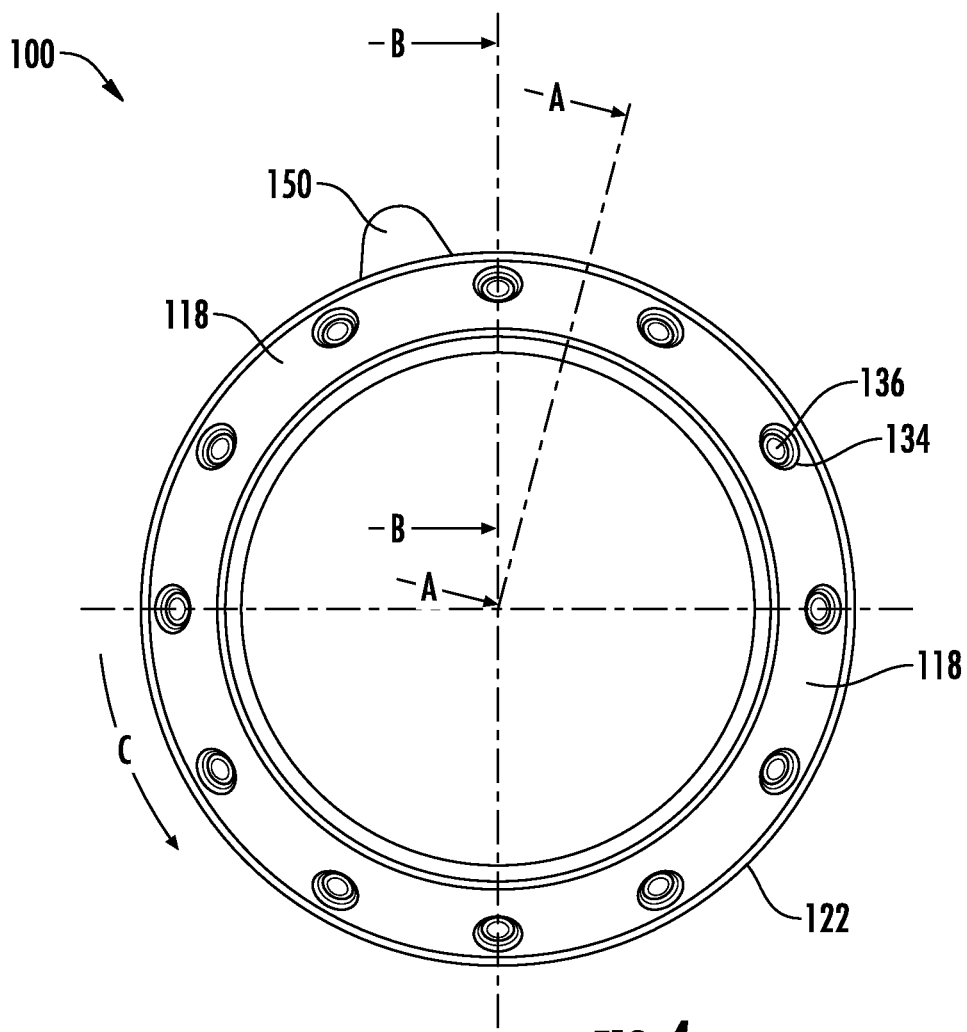
FIG. 4 illustrates a front view of a burner, in accordance with embodiments of the present disclosure.
Figure 7:
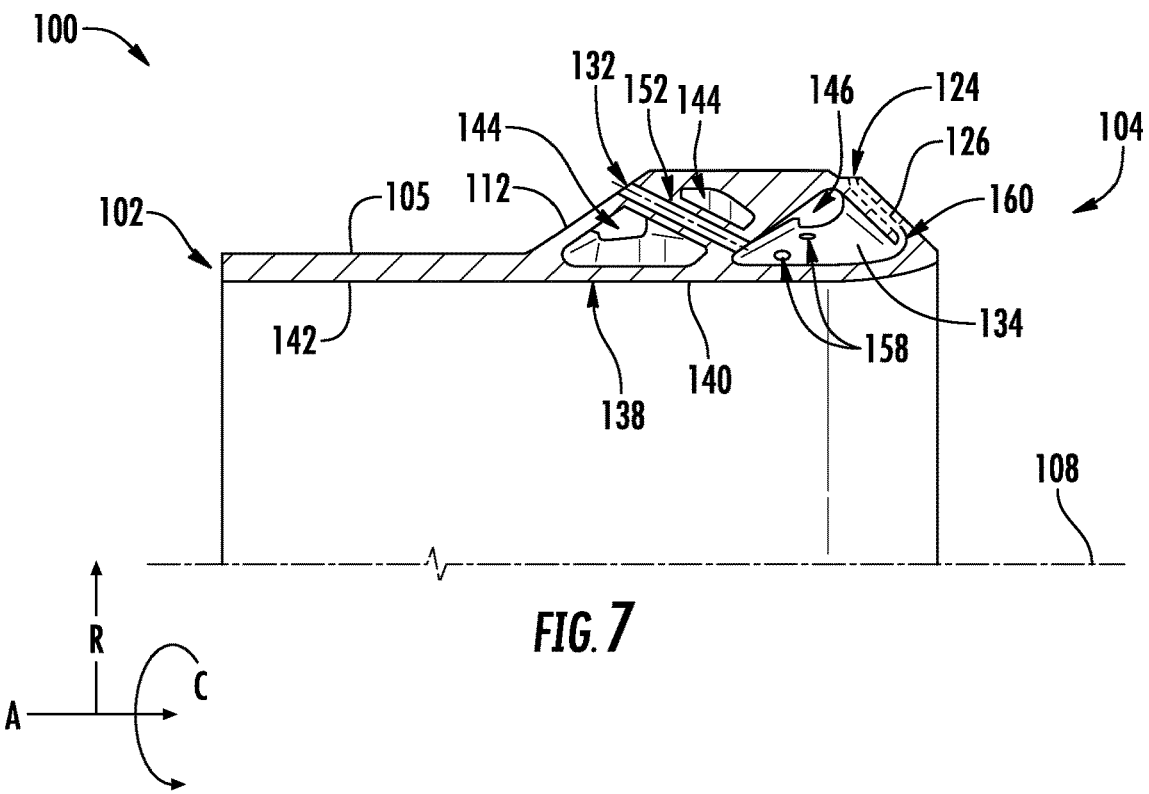
FIG. 7 illustrates another cross-section side view of a burner rotated relative to FIG. 6, in accordance with embodiments of the present disclosure.

FIG. 4 illustrates a plan view of a burner 100, as viewed from an aft end looking in an upstream direction. As shown, the lip 122 is radially outward of the burner front face 118. Additionally, FIG. 4 illustrates the location of cross sections A-A and B-B that are illustrated in FIGS. 7 and 6, respectively.

Figure 5:
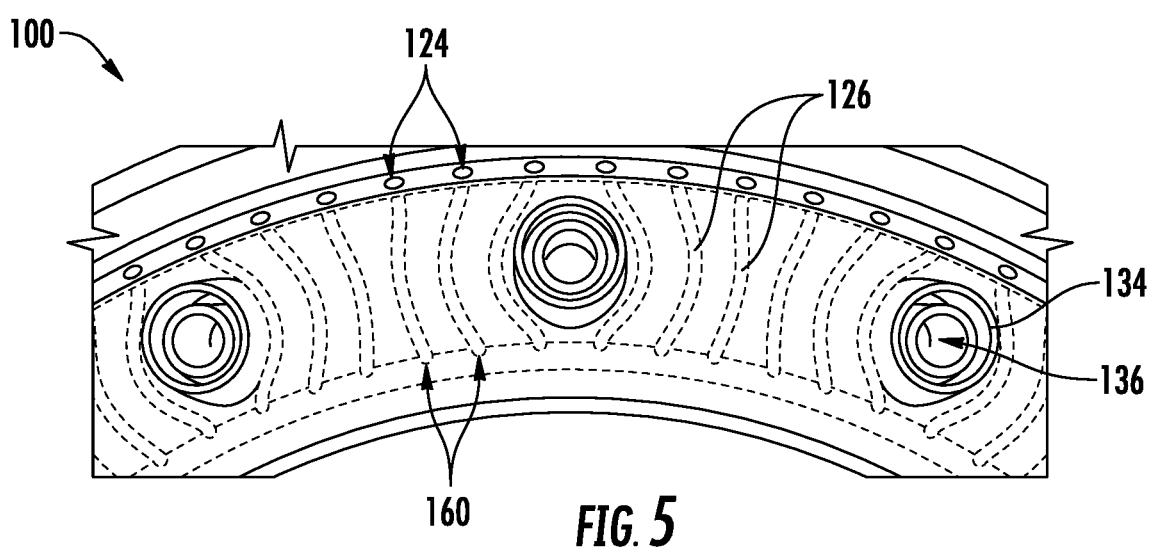
FIG. 5 illustrates an enlarged transparent front of a burner, in accordance with embodiments of the present disclosure.

FIG. 5 illustrates an enlarged transparent view of burner 100. In some embodiments, such as the one shown in FIG. 5, the main body 106 may further define a plurality of cooling channels 126 circumferentially spaced apart along the burner front face 118. In many embodiments, each of the cooling channels 126 may define an internal diameter that changes from a cooling channel inlet 160 to a cooling channel outlet 124. In some embodiments, each of the cooling channels 126 may have different diameters relative to one another. For example, a portion of the cooling channels 126 may have a diameter of up to about 0.15 inches, and another portion of the cooling channels may have a diameter of up to about 0.1 inches.

In particular embodiments, each of the cooling channels 126 may define a constant internal diameter. In some embodiments, the diameter of each of the cooling flow channels 126 may be up to about 0.15 inches. In other embodiments, the diameter may be between about 0.015 inches and about 0.15 inches. In various embodiments, the diameter of each of the cooling flow channels 126 may be between about 0.02 inches and about 0.125 inches. In many embodiments, the diameter of each of the cooling flow channels 126 may be between about 0.025 inches and 0.06 inches. In particular embodiments, the diameter of each of the cooling flow channels 126 may be between about 0.03 inches and about 0.05 inches.

Figure 8:
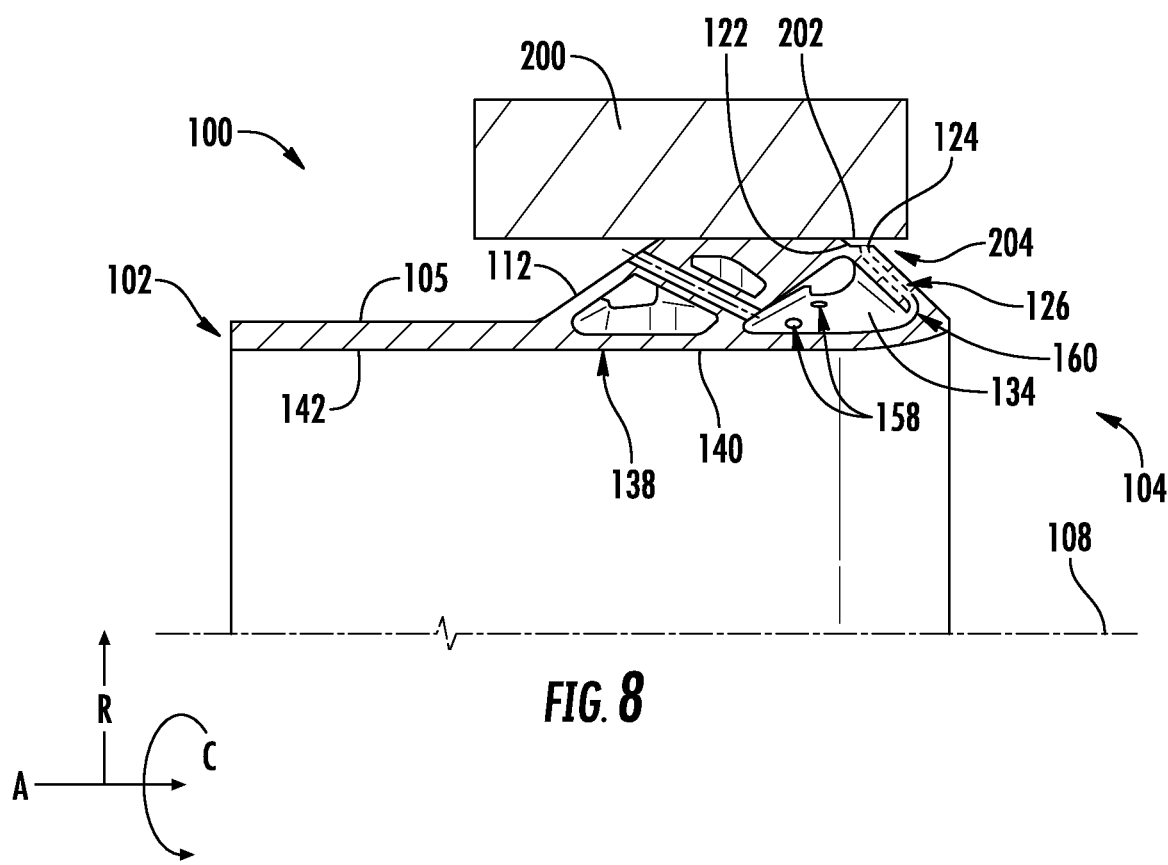
FIG. 8 illustrates a cross-sectional side view of a burner positioned adjacent to a wall, in accordance with embodiments of the present disclosure.

The cooling channels 126 may extend generally radially along the burner front face 118. Further, each cooling channel 126 may be substantially curvilinear, arcuate, or otherwise bent in the circumferential direction. In many embodiments, the cooling channels 126 may advantageously provide a single air circuit for cooling both the burner front face 118 and for purging the cavity 204 (FIG. 8). As used herein, "purging" refers to utilizing a flow of cooling air, e.g., cooling air from the compressor section 14, to flush out stagnant hot air from various cavities and crevices of the burner 100.

Each cooling channel 126 may be integrally formed within the main body 106 of burner 100. For example, the cooling channels 126 may be formed within the main body via a 3D printing or additive manufacturing process. The size, shape, and orientation of the cooling channels 126 advantageously provides a cooling circuit that cannot be manufactured using conventional machining method, e.g., turning, drilling, milling, broaching, or other related operations that involve material removal.

FIG. 6 illustrates a cross-section of a burner 100 along the plane B-B shown in FIG. 3. Likewise, FIG. 7 illustrates a cross-section of a burner 100 along the plane A-A of FIG. 3. As shown in FIGS. 6 and 7 collectively, the burner 100 may further define an interior 138 radially inward from the outer surface 112. In many embodiments, the main body 106 may define a first portion 140 of the interior 138, and the upstream portion 105 may define a second portion 142 of the interior 138.

In some embodiments, the burner 100 may include an annular fuel plenum 144 and an annular air plenum 146 separately defined within the main body. As shown in FIGS. 6 and 7, the annular fuel plenum 144 and the annular air plenum 146 may be defined radially between the outer surface 112 and the first portion 140 of the interior 138. The annular fuel plenum 144 may be circumferentially defined within the main body 106 of burner 100. In many embodiments, the annular fuel plenum 144 may be fluidly coupled to the fuel inlet 150 and may be configured to receive fuel 28 therefrom. The annular fuel plenum 144 may be defined axially upstream from the annular air plenum 146.

As shown in FIGS. 6 and 7, the annular air plenum 146 may be defined circumferentially within the main body 106 of burner 100. Additionally, as shown, the annular air plenum 146 may be defined axially downstream from the annular fuel plenum 144. The annular fuel plenum 144 and the annular air plenum 146 may be two separately defined plenums adjacent to one another within the main body 106 of burner 100. As shown in FIGS. 6 and 7, a cooling air passage 152 may extend through the annular fuel plenum 144 and may be fluidly coupled to the annular air plenum 146. For example, the cooling air passage 152 may extend from a cooling air inlet 132 on the outer surface 112, through the annular fuel plenum 144, and be fluidly coupled to the annular air plenum 146. The cooling air passage 152 may function to provide compressed cooling air to the annular air plenum 146 for cooling of various features of burner 100.

The main body 106 may further define a pilot nozzle 154 that extends from the pilot air inlet 128 at the forward portion 114 to the pilot nozzle outlet 136 at the burner front face 118. The pilot nozzle 154 may be fluidly coupled to the annular fuel plenum 144 via one or more fuel inlets 156 positioned axially downstream from the pilot air inlet 128. The pilot fuel nozzle 154 may function to provide a mixture of fuel 28 and compressed air 26 to the combustion chamber 42.

In various embodiments, as shown in FIGS. 6 and 7 collectively, the downstream end of the pilot nozzle 154 may be surrounded by an outer sleeve 134, and the outer sleeve 134 may be fluidly coupled to the annular air plenum 146 via one or more sleeve inlets 158. The outer sleeve 134 may provide air for cooling of the pilot nozzle outlet 136 and the burner front face 118. In many embodiments, as shown in FIG. 5, one or more cooling channels 126 may surround the outer sleeve 134 along the burner front face 118. For example, the one or more cooling channels 126 may curve around the periphery of each outer sleeve 134 to advantageously provide cooling to a larger area of the burner front face 118.

As shown in FIGS. 5 and 7, each of the plurality of cooling flow channels 126 may be fluidly coupled to the annular air plenum 146 via a respective cooling channel inlet 160. Each cooling channel inlet 160 may be generally equally spaced apart from one another in the circumferential direction within the annular air plenum 146. Additionally, the cooling channel outlets 124 may also be generally equally spaced apart from one another in the circumferential direction C within the outer surface 112 and along the middle portion 116. Each cooling channel 126 may extend between a cooling channel inlet 160 and a cooling channel outlet 124. As shown best in FIG. 7, each cooling flow channel 126 may be generally parallel to, or aligned with, the burner front face 118.

FIG. 8 illustrates a burner 100 positioned adjacent to and in direct contact with a wall 200. The wall 200 may include an interior surface 202 that directly abuts the middle portion 116 of outer surface 112 of the burner 100. As shown, a cavity 204 may be disposed radially between the lip 122 and the interior surface 202 of the wall 200. The cavity 204 may be annularly defined and continuous in the circumferential direction.

In some instances, a portion of combustion gases 36 may flow upstream and reach a flow "dead zone" within the cavity 204. If not flushed out, this portion of combustion gases 36 may damage the burner 100 over time and negatively impact the performance of the gas turbine 10. As shown and described herein, the cooling flow channels 126 advantageously provide a single air circuit that both cools the burner front face 118 and purges the combustion gases 30 from the cavity 204. For example, the same cooling air that travels through the plurality of cooling flow channels 126 and cools the burner front face 118 is used for purging the cavity 204.

The cooling air passage 152, the annular air plenum 146 and the cooling channels 126 may together form a single cooling air circuit that advantageously provides cooling for multiple features of burner 100. For example, in operation, compressed air 26 from the head end portion 38 of the combustor 16 may enter the annular air plenum 146 by traveling downstream, through the plurality of cooling air passages 152. Subsequently, compressed air 26 from the annular air plenum 146 may enter either or both of the outer sleeve inlets 158 and/or the cooling channel inlets 160. A first portion of the compressed air 26 entering the outer sleeve inlets 158 may surround and cool the pilot nozzle outlet 136. A second portion of compressed air 26 entering the cooling channel inlets 160 may reverse directions and travel generally towards the upstream end 102 within the cooling channels 126 and along the burner front face 118. The compressed air 26 exiting the cooling channels 126 via the cooling channel outlets 124 may be directed towards the cavity 204 to purge any hot combustion gases 30. In many embodiments, the compressed air 26 exiting the cooling flow channels 126 may be traveling generally radially to prevent the fuel 28 and air 26 mixture exiting the pilot nozzle outlets 138 from traveling upstream and recirculating back into the burner 100.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims, if they include structural elements that do not differ from the literal language of the claims, or if they include equivalent structural elements with insubstantial differences from the literal language of the claims.

What is claimed is:

1. A burner for a turbomachine, the burner defining an axial direction, a radial direction, and a circumferential direction, the burner comprising:
   a main body comprising an outer surface and defining an interior, the main body having an upstream end axially spaced from a downstream end with respect to an axial centerline of the burner; the outer surface comprising in an axially sequential order: a forward portion, a middle portion generally parallel to the axial direction, and a burner front face at the downstream end of the main body, wherein the forward portion diverges radially outwardly from an upstream portion of the main body to the middle portion, wherein the burner front face converges radially inwardly from the middle portion to the downstream end;
   an annular air plenum defined in the main body radially inwardly from the outer surface;
   a cooling air passage extending from the outer surface to the annular air plenum; and
   a plurality of cooling channels circumferentially spaced apart from one another along the burner front face, each cooling channel of the plurality of cooling channels extending from a respective inlet configured to receive air from the annular air plenum to a respective outlet defined in the middle portion of the outer surface upstream from the burner front face, wherein the inlet is axially aft of the outlet such that each cooling channel of the plurality of cooling channels extends towards the upstream end of the main body, and wherein the plurality of cooling channels is oriented generally parallel to the burner front face in an axial-radial plane and disposed between the burner front face and the annular air plenum.

2. The burner as in claim 1, wherein the middle portion of the outer surface further defines a lip axially upstream from the respective outlets of the plurality of cooling channels, the lip extending radially beyond the respective outlets.

3. The burner as in claim 1, wherein each of the plurality of cooling channels has a constant internal diameter.

4. The burner as in claim 1, wherein each of the plurality of cooling channels has a varying internal diameter.

5. The burner as in claim 1, wherein each of the plurality of cooling channels is substantially curvilinear in the circumferential direction between the respective inlet and the respective outlet.

6. The burner as in claim 1, further comprising an annular fuel plenum axially upstream from the annular air plenum, wherein the cooling air passage extends through the annular fuel plenum.

7. The burner as in claim 6, further comprising a plurality of pilot nozzles circumferentially spaced apart from one another and positioned radially inwardly from the annular fuel plenum and the annular air plenum, each pilot nozzle having an air inlet defined in the upstream end of the burner, a fuel inlet downstream from the air inlet fluidly coupled to the annular fuel plenum, and an outlet defined on the burner front face.

8. The burner as in claim 7, wherein one or more cooling channels of the plurality of cooling channels is curvilinear and surrounds the outlet of at least one pilot nozzle of the plurality of pilot nozzles such that the one or more cooling channels of the plurality of cooling channels curves partially around the outlet of the at least one pilot nozzle as the one or more cooling channels of the plurality of cooling channels extends between the inlet and the outlet.

9. A turbomachine, comprising:
   a compressor section;
   a turbine section; and
   a combustor section comprising a plurality of burners, each burner defining an axial direction, a radial direction, and a circumferential direction, each burner comprising:
      a main body comprising an outer surface and defining an interior, the main body having an upstream end axially spaced from a downstream end with respect to an axial centerline of the burner, the outer surface comprising in an axially sequential order: a forward portion, a middle portion generally parallel to the axial direction, and a burner front face at the downstream end of the main body, wherein the forward portion diverges radially outwardly from an upstream portion of the main body to the middle portion, wherein the burner front face converges radially inwardly from the middle portion to the downstream end;
      an annular air plenum defined in the main body radially inwardly from the outer surface;
      a cooling air passage extending from the outer surface to the annular air plenum; and
      a plurality of cooling channels circumferentially spaced apart from one another along the burner front face, each cooling channel of the plurality of cooling channels extending from a respective inlet configured to receive air from the annular air plenum to a respective outlet defined in the middle portion of the outer surface upstream from the burner front face, wherein the inlet is axially aft of the outlet such that each cooling channel of the plurality of cooling channels extends towards the upstream end of the main body, and wherein the plurality of cooling channels is oriented generally parallel to the burner front face in an axial-radial plane and disposed between the burner front face and the annular air plenum.

10. The turbomachine as in claim 9, wherein the respective outlet of each cooling channel in the plurality of cooling channels is defined in the middle portion of the outer surface such that the respective outlet faces the radial direction.

11. The turbomachine as in claim 9, wherein the middle portion of the outer surface further defines a lip axially upstream from the respective outlets of the plurality of cooling channels, the lip extending radially beyond the respective outlets.

12. The turbomachine as in claim 9, wherein each of the plurality of cooling channels has a constant internal diameter.

13. The turbomachine as in claim 9, wherein each of the plurality of cooling channels has a varying internal diameter.

14. The turbomachine as in claim 12, wherein the constant internal diameter is up to about 0.15 inches.

15. The turbomachine as in claim 9, wherein each of the plurality of cooling channels is substantially curvilinear.

16. The turbomachine as in claim 9, further comprising an annular fuel plenum axially upstream from the annular air plenum, wherein the cooling air passage extends through the annular fuel plenum.

17. The turbomachine as in claim 16, further comprising a pilot nozzle positioned radially inwardly from the annular fuel plenum and the annular air plenum, the pilot nozzle having an air inlet defined in the upstream end of the burner, a fuel inlet downstream from the air inlet fluidly coupled to the annular fuel plenum, and an outlet defined on the burner front face.

18. The turbomachine as in claim 17, wherein one or more cooling channels of the plurality of cooling channels.

19. The turbomachine as in claim 11, further comprising a wall having an interior surface, wherein the middle portion is in contact with the interior surface of the wall forward of the lip, wherein the middle portion is spaced apart from the interior surface of the lip aft of the lip such that a cavity is defined radially between the interior surface of the wall and the outer surface of the burner, and wherein each of the respective outlets is positioned on the outer surface at the cavity.

20. The burner as in claim 7, wherein the plurality of cooling channels include a first group of cooling channels and a second group of cooling channels disposed circumferentially between two outlets of two pilot nozzles of the plurality of pilot nozzles, wherein each cooling channel in the first group of cooling channels is substantially curvilinear in a first circumferential direction between the respective inlet and the respective outlet, and wherein each cooling channel in the second group of cooling channels is substantially curvilinear in a second circumferential direction between the respective inlet and the respective outlet, the second circumferential direction opposite the first circumferential direction.

* * * * *